US008805456B1

(12) United States Patent
Hardy et al.

(10) Patent No.: US 8,805,456 B1
(45) Date of Patent: Aug. 12, 2014

(54) WIRELESS CHARGING BASE WITH INTEGRATED SHORT RANGE COMMUNICATION

(75) Inventors: Michael Hardy, Warren, NJ (US); Frank LaRocca, Marlboro, NJ (US)

(73) Assignee: Celico Partnership, Basking Ridge, NJ (US)

( * ) Notice: Subject to any disclaimer, the term of this patent is extended or adjusted under 35 U.S.C. 154(b) by 369 days.

(21) Appl. No.: 13/250,154

(22) Filed: Sep. 30, 2011

(51) Int. Cl.
*H04M 1/00* (2006.01)
*H04B 1/38* (2006.01)

(52) U.S. Cl.
USPC .......................................... 455/573; 455/41.1

(58) Field of Classification Search
CPC ... H04B 5/0012; H04B 5/0031; H04B 5/0037
USPC ...................... 455/41.2, 41.1, 573
See application file for complete search history.

(56) References Cited

U.S. PATENT DOCUMENTS

| 7,906,936 B2 | 3/2011 | Azancot et al. |
| 7,953,400 B2 | 5/2011 | Lee et al. |
| 2009/0049554 A1* | 2/2009 | Vuong et al. ................. 726/26 |
| 2011/0050164 A1 | 3/2011 | Partovi et al. |
| 2013/0093388 A1* | 4/2013 | Partovi ........................ 320/108 |

OTHER PUBLICATIONS

Palm Touchstone Standalone Charging Dock for Pre Plus—Palm Pre Plus Cradles, website accessed Jun. 6, 2011.
Audyssey Audio Dock: Couth of Market Edition offers high-end Bluetooth music streaming for your phone, ENGADGET, website accessed Jun. 3, 2011.
iHome IP47BR Alarm Clock Radio with Bluetooth Speakerphone, TheBuyFly.com, website accessed Jun. 3, 2011.

* cited by examiner

*Primary Examiner* — Lewis West

(57) ABSTRACT

A wide area communication system includes a mobile communication device and an inductive charging base that charges the battery of the wireless mobile communication device through inductive coupling. The inductive charging base may receive data from the wireless mobile communication device via a short range wireless communication link while the wireless mobile communication device is charging using the inductive charging base. One or more applications stored on the wireless mobile communication device can be automatically activated and data can be sent from the wireless mobile communication device to the inductive charging base via the short range wireless communication link, only while the wireless mobile communication device is Bluetooth paired with the inductive charging base and there is inductive coupling between the inductive charging base and the wireless mobile communication device.

20 Claims, 7 Drawing Sheets

300

WIRELESS CHARGING BASE WITH INTEGRATED SHORT RANGE COMMUNICATION

TECHNICAL FIELD

This disclosure relates to providing power wirelessly to a mobile communication device and to automatically configuring the communication device for transferring data from to a charging station having a short range local wireless transceiver, such as a Bluetooth transceiver.

BACKGROUND

Wireless mobile communication devices, such as cell phones, smart phones, laptops, and tablet computers, are in widespread use. They are typically powered by power cells which are generally electrochemical cells (i.e., batteries). It is common for these cells to be rechargeable. Indeed, a portable device is often provided with a charger unit, which mechanically and electrically connects to the portable device and a wall outlet and converts power from the form on the AC mains outlet to the DC power needed to charge the battery. Specific cables or connectors are required to attach the portable device to the charger. With miniaturization of the portable devices and connectors, the connection between the device and its charger is becoming increasingly fiddly and fragile. Further, the connectors may degrade over time. Moreover, if the wire between the charger and the portable device is jerked, the coupling of the portable device and/or the wire may be damaged.

Base stations exist that mechanically or even wirelessly couple to a portable device. For example, base stations may include an inductive charger to wirelessly charge a portable device. Other base stations may mechanically and electrically couple to the portable device to, for example, play MP3 files of the portable device. However, current base stations don't fully take advantage of the advanced capabilities of the portable device. For example existing devices do not provide inductive charging and the ability to perform additional functions such as playing music and displaying pictures while charging.

There is therefore a need for a wireless communication device that can not only wirelessly charge at an inductive charging base but also wirelessly communicates with the base station to take advantage of the enhanced features of the portable device.

SUMMARY

The equipment and methods discussed by way of examples in the description of the drawings relate to configuration of a wireless mobile communication device to wirelessly communicate with an inductive charging base, while the device is coupled to enable charging via the base. The communication and configuration, for example, enable use of advanced capabilities of the wireless mobile communication device via the inductive charging base while the device is on the base for charging.

An example of a wide area communication system includes a wireless mobile communication device which is Bluetooth enabled. The wireless mobile communication device includes a battery configured to supply energy stored within the battery to the wireless mobile communication device. This battery can be charged through inductive coupling with an inductive charging base. The inductive charging base may charge the battery and receive data from the wireless mobile communication device via Bluetooth. Applications are stored on the wireless mobile communication device. One or more of the stored applications can be automatically activated and/or data can be sent via Bluetooth from the wireless mobile communication device to the inductive charging base, only while the wireless mobile communication device is Bluetooth paired with the inductive charging base and there is inductive coupling between the inductive charging base and the wireless mobile communication device.

For example, a wireless mobile communication device (e.g., Smartphone) is placed in proximity to the wireless charger. The device determines whether there is inductive coupling between the wireless mobile communication device and the inductive charging base. If inductive coupling is detected, it is then determined whether there is Bluetooth pairing between the wireless mobile communication device and the inductive charger. In one example, if there is no pairing, the wireless mobile communication device is charged until the charge is complete or the inductive coupling is severed. In another example, the wireless mobile communication device is not charged by the inductive charging base until Bluetooth pairing is established.

Once both inductive coupling and Bluetooth pairing are established, at least one preselected application automatically starts execution on the wireless mobile communication device. The preselected application program(s) execute during the inductive charging of the wireless mobile communication device while there is both inductive coupling and Bluetooth pairing between the wireless mobile communication device and the inductive charger.

Once the wireless mobile communication device is removed from the base, the inductive charging is severed, execution of any application program activated for data communication via the Bluetooth pairing with the inductive charging base also is terminated to de-activate the data communication. In one example, this de-activation is performed by the wireless mobile communication device. If the wireless mobile communication device is not removed, it is determined whether the charge is complete. When charged, the inductive charging is disabled, while the application and associated data communication are allowed to continue. If the charge is not complete, both the charging and the application continue.

The present teaching also encompass a wireless mobile communication device including a wide area wireless transceiver for wireless communication for the wireless mobile communication device with a public wide area mobile communication network. The wireless mobile communication device includes a short range local wireless transceiver for wireless communication with a short range local wireless transceiver of another device. For example, the short range local wireless transceiver can employ Bluetooth or Wi-Fi.

A processor controls the transceivers. A battery supplies power to the processor and the transceivers. The wireless mobile communication device includes a coil for inductive coupling to an external inductive charging base having a previously identified short range local wireless transceiver. A charging circuit coupled to the coil and the battery is configured to charge the battery. This charging is in response to power being received inductively via the coil. The wireless mobile communication device further includes a memory accessible to the processor. A control program is stored in the memory for execution by the processor to implement features utilizing the wireless communication via the short range local wireless transceiver. The execution of the control program by the processor configures the wireless mobile communication device to perform several functions. The control program is similar to firmware whereas the application program is similar to application software.

For example, the wireless mobile communication device can perform the function of identifying at least one of the application programs as being pre-selected for execution during inductive charging. Further, it can detect pairing of the short range local wireless transceiver of the wireless mobile communication device with the previously identified short range local wireless transceiver of the inductive charging base. The wireless mobile communication device can further perform the function of detecting initiation of the charging of the battery in response to power received from the inductive charging base via the coil.

Further, when pairing is detected and initiation of the charging is detected, the wireless mobile communication device can (1) automatically activate an identified application program for execution by the processor, and (2) initiate transfer of data from the wireless mobile communication device under control of the execution of the automatically activated application program via the short range local wireless transceiver of the wireless mobile communication device to the previously identified short range local wireless transceiver of the inductive charging base.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1A:
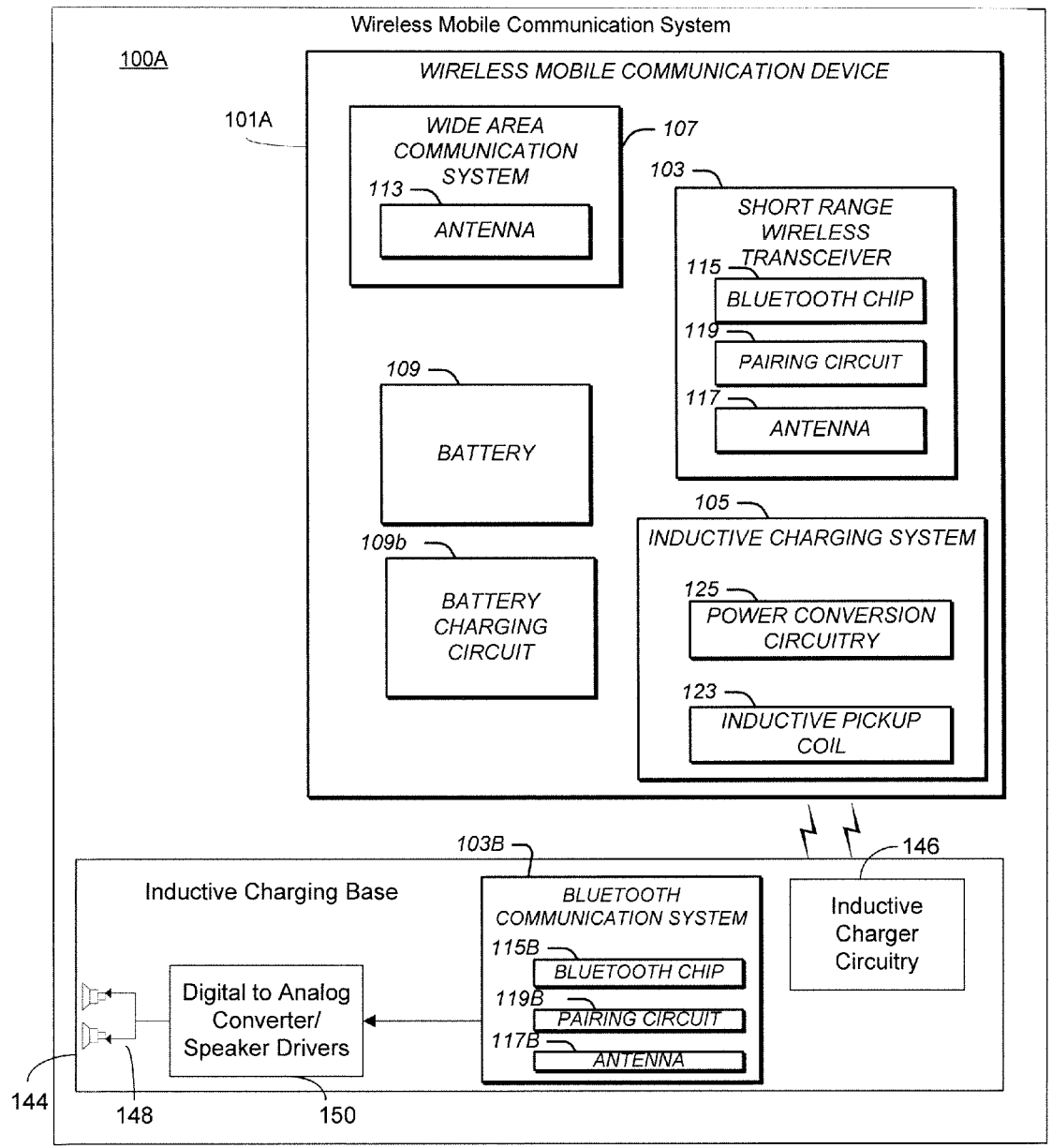
FIG. 1A illustrates an example of a wide area communication system including a wireless mobile communications device with a Bluetooth transceiver coupled to an inductive charging base having a compatible transceiver.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

FIG. 1 illustrates an example of a wide area communication system 100A including a wireless mobile communication device 101 and an inductive charging base 144.

The wireless mobile communication device 101A includes an inductive charging system 105 for coupling to the base 144 and a short range wireless transceiver 103 (e.g., Bluetooth or Wi-Fi) for short range data communications with other devices, including in this case, with a compatible transceiver 103B in the base 144. As illustrated in FIG. 1, the wireless mobile communication device 101 also includes a wide area communication system 107, a battery 109, and a battery charging circuit 109b.

The wide area communication system 107 configures the wireless mobile communication device 101A to communicate wirelessly over a public or wide area communication network, such as a public cellular network (not shown). The wireless mobile communication device 101 may be of any type. For example, the wireless mobile communication device may consist of or include a cell phone, a smart phone, a laptop computer, or a tablet computer.

The wide area communication system 107 is configured to communicate wirelessly over a communication network, such as a cellular communication network. The wide area communication system 107 includes an antenna 113 configured to facilitate the wireless transmission and reception of signals that carry the communication to/from the wide area network. The wide area communication system 107 also includes a user interface to facilitate receiving and sending the communications. The user interface may include a display, a touch screen, a keyboard, a pointing device, a microphone, a loudspeaker, and/or any other type of user interface device. The wide area communication system 107 may also include a computer processing system configured to process the communications, which may include an operating system and one or more application programs (i.e., software).

Short range wireless transceiver 103 is configured to exchange data over short distances. For example, short range wireless transceiver 103 may be a Wi-Fi or Bluetooth transceiver. In a Bluetooth embodiment, short range wireless transceiver 103 exchanges data over short distances using short wavelength radio transmissions in the ISM band from 2400-2480 MHz with low power consumption. For example, class 1 Bluetooth uses 100 mW of power to cover a communication range of approximately 100 m; class 2 Bluetooth uses 2.5 mW for 10 m, and class 3 Bluetooth requires less than 1 mW for a range of 5 m. Wireless communication device 101 uses short range wireless transceiver 103 to be paired with various devices. For example, it is paired with an inductive charging base 144.

In the example above, short range wireless transceiver 103 includes a communication chip 115 (e.g., Bluetooth) to communicate with other systems with compatible protocol/transceivers (i.e., Bluetooth enabled devices). In one embodiment, the Bluetooth chip 115 includes a receiver, voltage controlled oscillator (VCO), digital signal processor (DSP), analog to digital converter (ADC), amplifier, etc., (components not shown). Short range wireless transceiver 103 further includes a pairing circuit 119 configured to match or pair the wireless mobile communication device 101 to another short range wireless transceiver (i.e., Bluetooth enabled device). Pairing includes determining compatibility and authorization between the protocols of two short range communication devices.

For example, the communication device 101 is paired with inductive charging base 144. In this regard, pairing establishes a trusted relationship between the wireless communication device 101 and the inductive charging base 144. Although a user might opt to be prompted to enter a passkey every time a pairing is to be established, it is possible to have the passkey stored in the pairing circuit 119 for automatic connections.

Short range wireless transceiver 103 includes an antenna 117 configured to send and receive (e.g., Bluetooth or Wi-Fi) data as over-the-air radio signals. For Bluetooth operations, the short range wireless transceiver 103 streams data via the antenna 117 for over the air transmission from the wireless mobile communication device 101 to the inductive charging base 144.

The inductive charging system 105 is configured to inductively charge the battery 109 through the battery charging circuit 109b when coupled to a charging base such as 144. The inductive charging system 105 includes an inductive pickup coil 123 configured to convert an alternating electromagnetic field that intersects the inductive pickup coil 123 into an alternating electrical current. The frequency bands in which the inductive pickup coil 123 and the wireless communication elements 103, 107 operate are non-overlapping and non-interfering and thus are able to be used for entirely different purposes. Specifically, the chip 115 and the antenna 117 transmit and receive wireless communications in the Bluetooth band (i.e., 2,402 to 2,480 MHz), the wide area communication system 107 communicates in one of the assigned public transmission bands (also in MHz ranges), whereas the inductive pick up coil 123 receives energy at a comparatively low frequency (e.g., 150 kHz) for charging the battery 109. The frequency band in which the antenna 113 operates is non-overlapping and non-interfering with those of the inductive pickup coil 123 and antenna 117.

The inductive charging system 105 also includes power conversion circuitry 125 configured to convert the alternating current received via the coil 123 into a direct current. The power conversion circuitry 125 provides the direct current into the battery charging circuit 109b, which is configured to charge the battery 109 in a regulated manner, such as at a rate that is appropriate for the battery 109 and so as to cease charging the battery 109 after the battery 109 is fully charged.

Inductive charging base 144 includes an inductive charger circuitry 146. The inductive charger circuitry 146 includes an inductive pickup coil (not shown) to inductively couple with the inductive pickup coil 123 of the inductive charging system 105 of the wireless mobile communication device 101A. The inductive charging base 144 further includes a short range wireless transceiver (e.g. Bluetooth) 103B. The short range wireless transceiver 103B is similar to the short range wireless transceiver 103 of the wireless mobile communication device 101A in that it includes a short range communication ship 115B, a matching (or pairing) circuit 119B, and an antenna 117B. In one embodiment, inductive charging base 144 further includes a digital to analog converter (DAC) and speaker drivers 150 to drive speakers 148.

Those skilled in the art presumably are familiar with the structure, programming and operations of the various types of mobile communication devices. However, for completeness, it may be useful to consider the functional elements/aspects of an exemplary mobile communication device 101B at a high-level.

Figure 1B:
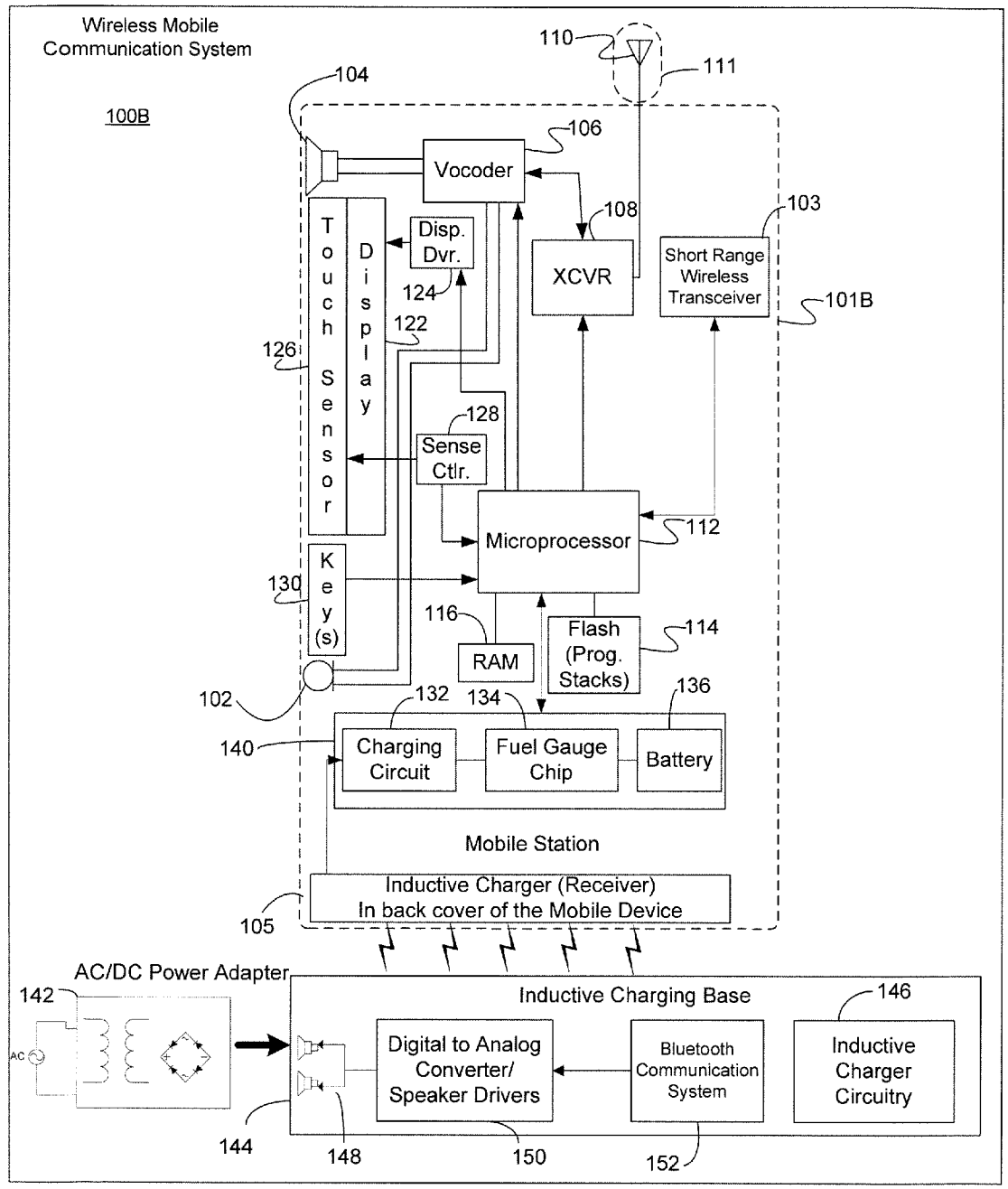
FIG. 1B illustrates another example of a system having a wireless mobile communications device including a short range wireless transceiver and an inductive charging base.

For purposes of such a discussion, FIG. 1B provides a block diagram illustration of an exemplary touch type wireless mobile communication device 101B. Although the wireless mobile communication device 101B may be a smartphone or may be incorporated into another device, such as a personal digital assistant (PDA) or the like, for discussion purposes, the illustration shows the wireless mobile communication device 101B is in the form of a handset. The handset embodiment of the wireless mobile communication device 101B functions as a normal digital wireless telephone station. For that function, the wireless mobile communication device 101B includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the wireless mobile communication device 101B also includes at least one digital transceiver (XCVR) 108. Today, the wireless mobile communication device 101B would be configured for digital wireless communications using one or more of the common network technology types. The concepts discussed here encompass embodiments of the wireless mobile communication device 101B utilizing any digital transceivers that conform to current or future developed digital wireless communication standards. The wireless mobile communication device 101B may also be capable of analog operation via a legacy network technology.

The transceiver 108 provides two-way wireless communication of information, such as vocoded speech samples and/or digital information. The transceiver 108 also sends and receives a variety of signaling messages in support of the various voice and data services provided via the wireless mobile communication device 101B and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The wireless mobile communication device 101B includes a display 122 for displaying messages, menus or the like, call related information dialed by the user, calling party numbers, etc. The wireless mobile communication device 101B also includes a touch/position sensor 126. The sensor 126 is relatively transparent, so that the user may view the information presented on the display 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the wireless mobile communication device 101B. The microphone 102 and speaker 104 may be used as additional user interface elements, for audio input and output. Of course, other user interface elements may be used, such as a trackball, as in some types of PDAs or smart phones.

In addition to normal telephone and data communication related input/output (including message input and message display functions), the user interface elements also may be used for display of menus and other information to the user and user input of selections. Some uses with respect to a mobile charging station are discussed in a later section.

A microprocessor 112 serves as a programmable controller for the wireless mobile communication device 101B, in that it controls all operations of the wireless mobile communication device 101B in accord with programming that it executes, for all normal operations, and for operations involved in the communication with the inductive charging base 144 discussed herein. In the example, the wireless mobile communication device 101B includes flash type program memory 114, for storage of various "software" or "firmware" program routines and mobile configuration settings, such as mobile directory number (MDN) and/or mobile identification number (MIN), etc. In one embodiment, mobile communication device 101B includes a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

The short range wireless transceiver 103 is configured to communicate with other Bluetooth enabled devices. In this regard, mobile communication device 101B is paired with an inductive charging base 144.

The wireless mobile communication device 101B includes an inductive charger 105. In one embodiment, the inductive charger 105 is in the back cover of the wireless mobile communication device 101B. The inductive charger 105 is coupled to a charging circuit 132, which ultimately provides charge to a rechargeable battery 136. A fuel gauge chip 134 is coupled between the battery 136 and the charging circuit 132. The fuel gauge chip determines the charge of the battery 136 and indicates when the battery 136 is charged. Once the battery 136 is charged, current to the battery 136 is cut off to prevent damage.

As outlined above, the wireless mobile communication device 101B includes a processor 112, and application programs stored in the flash memory 114 configures the processor 112 so that the wireless mobile communication device is capable of performing various desired functions, including in this case the functions involved in the technique for communicating (i.e., providing data) to the inductive charging base 144.

The structure and operation of wireless mobile communication devices 101A and 101B were described by way of example only. Wireless mobile communication devices 101A and 101B may have additional or different components, and the components that have been described may perform additional or different functions.

Inductive charging base 144 (illustrated in FIGS. 1A and 1B) is configured to wirelessly charge wireless mobile communication device 101. The charger 144 includes a short range wireless transceiver 103B similar to system 103 discussed above. In a Bluetooth implementation, the short range wireless transceiver 103B includes a Bluetooth chip 115B, a pairing circuit 119B, and an antenna 117B. Short range wireless transceiver 103B is configured to maintain a list of devices that have made successful connections in the past. It allows the pairing of a single wireless mobile communication device (i.e., wireless mobile communication device 101A or 101B) at any given moment. For example, short range wireless transceiver 103B allows pairing with a wireless mobile communication device that is in close proximity with the inductive charging base 144. Only after pairing is successful between the wireless mobile communication device 101 and the inductive charging base 144, is data between wireless mobile communication device 101 and the inductive charging base 144 be exchanged. Put differently, data is sent via the Bluetooth link (also indicated as via Bluetooth) from the wireless mobile communication device 101A or 101B to the inductive charging base 144 only while the particular wireless mobile communication device is Bluetooth paired with the inductive charging base 144. However, the one short range wireless transceiver 103B supports pairing with a data communication to/from a different wireless mobile communication device when the second device (not the first) is coupled to the base 144 for charging. In one embodiment, inductive charging base 144 further includes a digital to analog converter (DAC) and speaker drivers 150 to drive speakers 148.

Figure 2A:
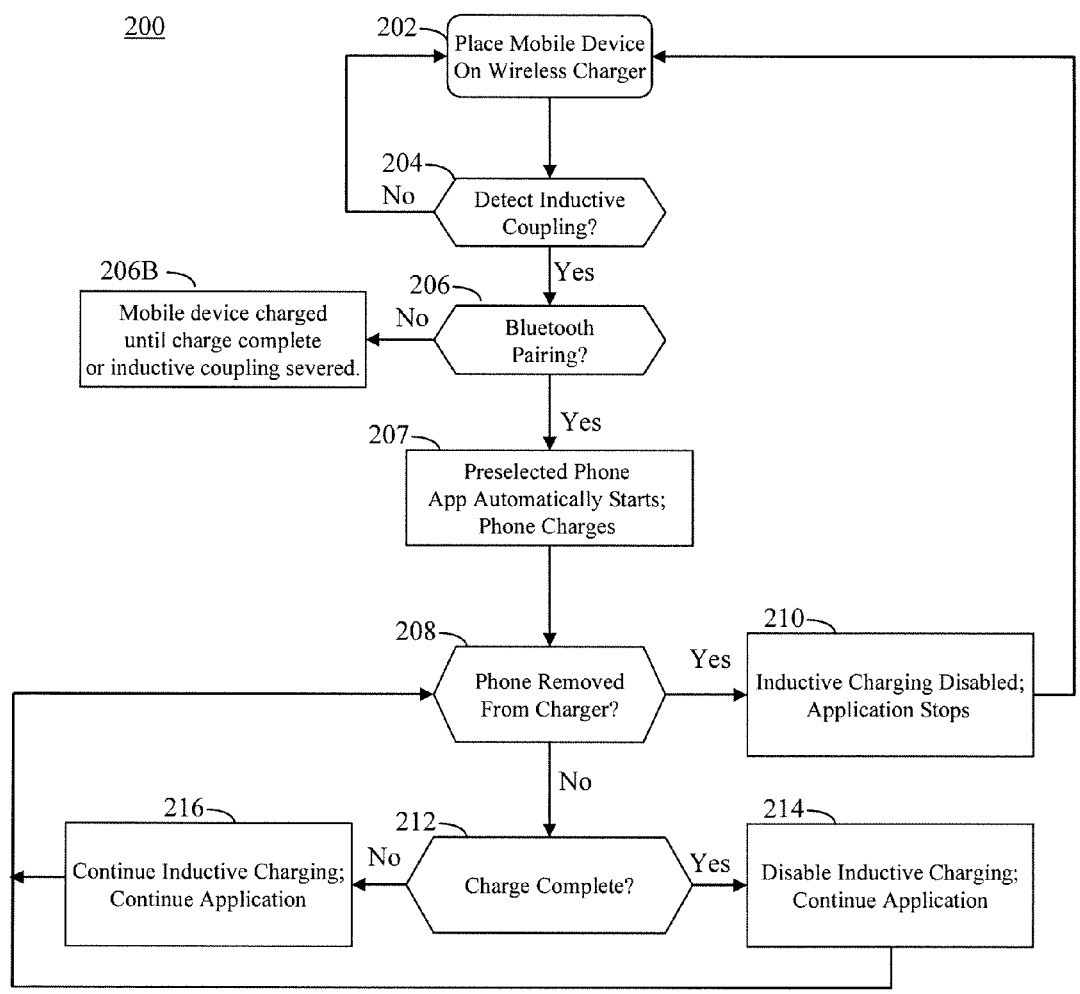
FIG. 2A illustrates an exemplary flow describing the interaction between a wireless mobile communication device and an inductive charging base.

FIG. 2A provides an exemplary flow 200 illustrating the interaction between a mobile communication device and an inductive charging base. For example, flow 200 illustrates the execution of a control program by the processor of the wireless mobile communication device to perform a plurality of functions. In step 202, a wireless mobile communication device 101A or 101B (e.g., phone) is placed in proximity to the wireless charger 144. For example, the device is placed on or within 5 mm of the inductive charging base. In step 204, the wireless mobile communication device determines whether there is inductive coupling between the wireless mobile communication device and the inductive charging base. If inductive coupling is detected, in step 206 it is determined whether there is matching (e.g. Bluetooth pairing) between the wireless mobile communication device and the inductive charging base. Alternatively, Bluetooth pairing can be determined before or concurrently with inductive coupling. In one example, if there is no pairing, the wireless mobile communication device is charged until the charge is complete or the inductive coupling is severed (i.e., step 206B). If the wireless mobile communication device is separated from the inductive charging base by a greater than effective inductive coupling distance, the inductive charging base and/or the wireless mobile communication device stops charging the battery. For example, the effective inductive coupling distance can be 5 mm, but can vary by the strength of the interactive coils between the inductive charging base and the wireless mobile communication device. The Bluetooth data communication between the wireless mobile communication device and the inductive charging base is also severed when the device is removed from the inductive charging base. In another example, the wireless mobile communication device is not charged by the inductive charging base until Bluetooth pairing is established.

In step 207, once Bluetooth pairing is established, at least one preselected phone application automatically starts. The at least one preselected phone application may or may not use the Bluetooth pairing such that, in some cases data is streamed from the phone to the charging base via the Bluetooth connection and in other cases the functionality of the application is limited to the phone. The application program(s) are stored in the memory of the wireless mobile communication device and executed by the processor of the wireless mobile communication device to implement features utilizing the wireless communication via the Bluetooth connection between the wireless mobile communication device and the inductive charging base. At least one of the application programs (identified as being pre-selected for execution) is executed during the inductive charging of the wireless mobile communication device.

Several types of application programs in connection with the inductive charging base can be preconfigured on the wireless mobile communication device to be active at this juncture. In one example, if the wireless mobile communication device (e.g., phone) is placed on the inductive charging base while a user is on a call, the speakers of the charging base may be preconfigured to automatically turn ON. In this case, the inductive charging base, while being inductively coupled and Bluetooth paired to the phone, receives calls and automatically plays those calls through its speakers. In another embodiment, if the phone is placed on the inductive charging base while the user is not on a call, the phone may wirelessly stream MP3 encoded music to the charging base through the Bluetooth link, which is played through the speakers of the inductive charging base. If a phone-call comes in during the Bluetooth streaming of MP3 encoded music, the streaming of the music is interrupted, allowing the call to be received through the speakers of the inductive charging base. The Bluetooth streaming of MP3 encoded music resumes after the speaker phone-call ends. In one example, the display of the wireless mobile communication device goes dark when there is a phone-call in progress and resumes/continues the previous image after the phone-call ends. In other embodiments, the phone is preprogrammed to operate as an alarm clock, display the time, or stream a variety of internet content through the short range wireless transceiver, etc.,—all while inductive coupling and Bluetooth pairing is established.

In step 208 of exemplary flow 200, it is determined whether the phone is removed from the base. For example, if the phone is removed more than 5 mm from the inductive charging base, the inductive charging is immediately severed, and the execution of applications that started as a result of the inductive charging and Bluetooth pairing being established may be terminated. In other cases, although the inductive charging is immediately severed, the execution of such applications may continue without using the charging base. For example, if MP3 encoded music is streamed from the phone to the charging base via Bluetooth during inductive charging, as soon as it is detected that the phone is picked up, the speakers of the charging base may no longer be used since the Bluetooth paring has been severed. Instead, the music is turned off on the phone or continues through the phone speakers, based on a user's prior selection (i.e., pre-programming of the phone). Similarly, if the speakers of the inductive charging base are used during charging rather than the speakers of the wireless mobile communication device, the speakers of the charging base may be immediately deactivated and the call continued through the regular phone speaker for privacy, as soon as the phone is removed from the charging base.

If it not is detected that the phone is removed, it is determined whether the charge is complete (i.e., step 212). When it is determined that the phone is fully charged, at step 214 the inductive charging is disabled but the application is allowed to continue. If it is determined that the phone is not fully charged, in step 216 both the charging and the application continue.

Figure 2B:
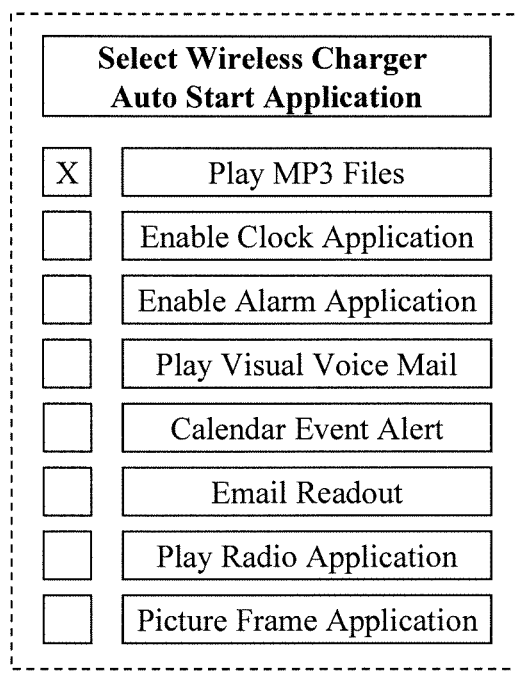
FIG. 2B illustrates an example of a user interface presented as a display on a wireless mobile communication device, to allow a user to pre-configure applications.

FIG. 2B illustrates an example of pre-configuring at least one of a plurality of applications stored on the wireless mobile communication device. For example, these applications are automatically activated when it is determined that there is both inductive coupling and short range communication matching (e.g., Bluetooth pairing) between the wireless mobile communication device and the charging base. Further, a variety of enhanced functionality may be selected through the interactive touch-screen of the wireless mobile communication device. In the example of FIG. 2B, the playing of MP3 encoded files is selected. One skilled in the art will readily recognize that additional pull-down menus are supported. In this example, when the wireless mobile communication device is placed on the inductive charger, MP3 files are streamed via Bluetooth to the inductive charging base while the wireless mobile communication device is charging. These MP3 files are previously selected by the user as part of the preconfiguration process. As discussed above, the activation of the pre-configured application on the wireless mobile communication device and the transfer of data from the wireless mobile communication device to the inductive charging base via Bluetooth occurs only when inductive coupling is initially detected and there is matching (e.g., Bluetooth pairing) between the inductive charging base and the wireless mobile communication device. Further, the pre-configured application on the wireless mobile communication device and any transfer of data from the wireless mobile communication device to the inductive charging base via the short range wireless transceiver (e.g., Bluetooth) may be deactivated when the inductive coupling is severed.

Figure 3A:
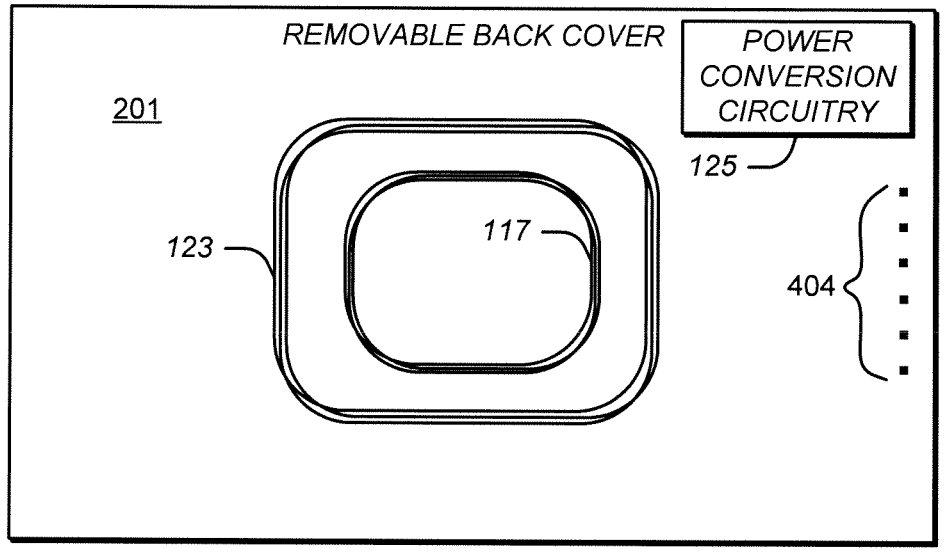
FIGS. 3A and 3B illustrate, respectively, an example of a removable back cover and a case base that collectively form the case and that contain the components of a wireless mobile communication device like one of those illustrated in FIGS. 1A and 1B, with the inductive charging system attached to the removable back cover.
Figure 3B:
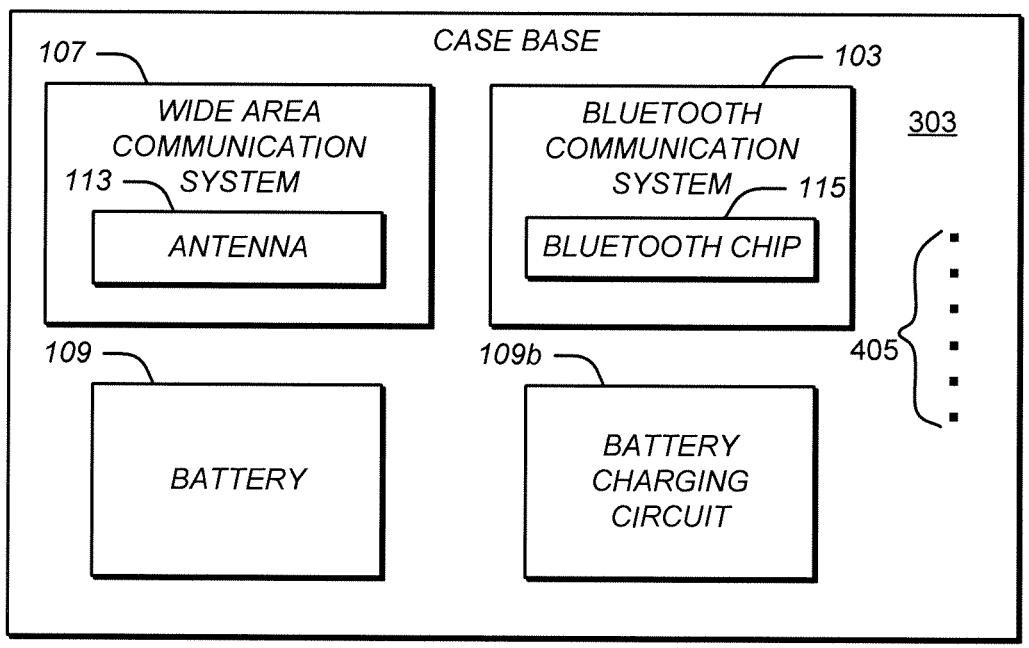
Figure 4A:
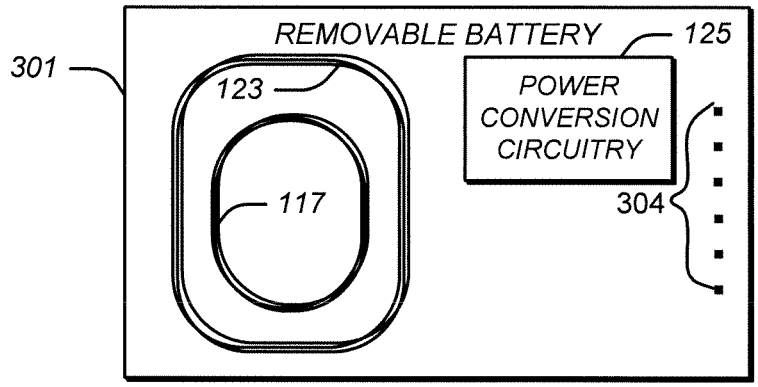
FIGS. 4A and 4B illustrate, respectively, an example of a removable battery and a case base that collectively contain the components of a wireless mobile communication device like one of those illustrated in FIGS. 1A and 1B, with the inductive charging system within the removable battery.
Figure 4B:
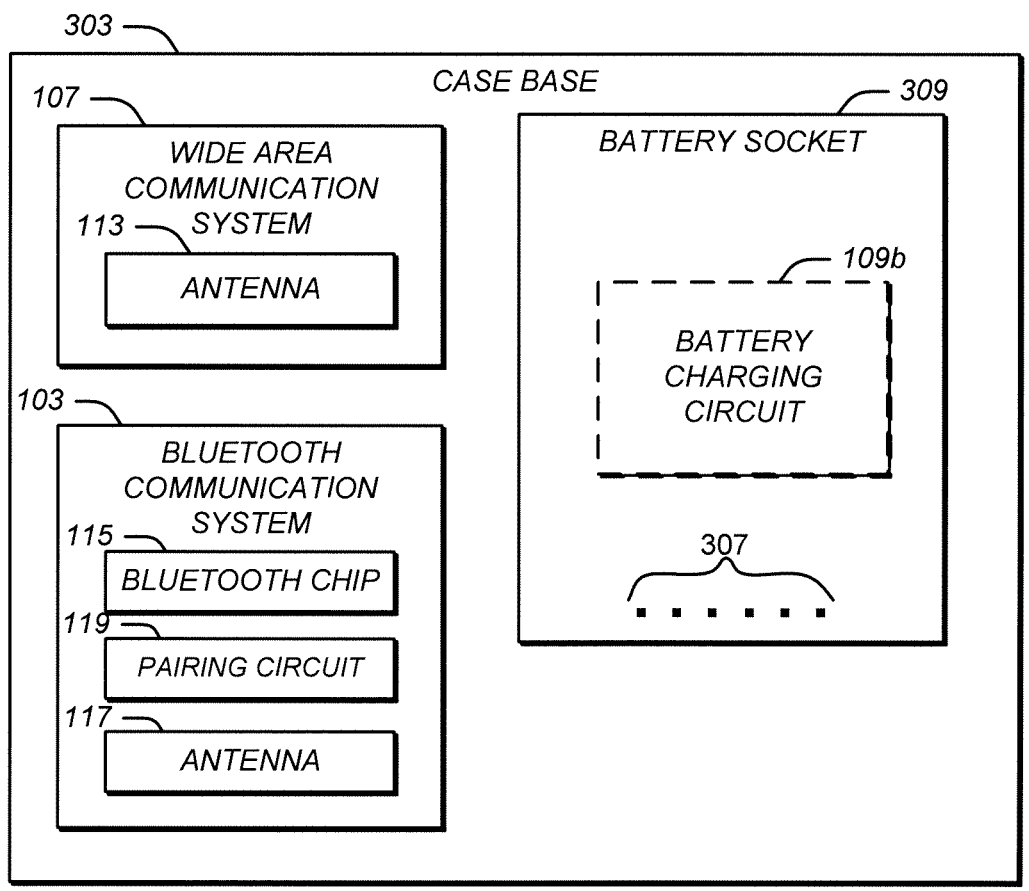

FIGS. 3A and 3B illustrate, respectively, an example of a removable back cover 201 and a case base 303 that collectively form the case and the wireless mobile communication device illustrated in FIGS. 1A/B, with the inductive charging system 105 attached to the removable back cover 201. Note that as used herein, the term "attached to" includes attaching components to the back cover 201 using mechanical structures or substances such as adhesive as well as embedding the components within the material (e.g., plastic) that forms the back cover 201.

As illustrated in FIG. 3A, in one example, the removable back cover 201 has attached to it the inductive pickup coil 123 of the inductive charging system 105 and the antenna 117 of the short range wireless transceiver 103. Also attached to the removable back cover is the power conversion circuitry 125 of the inductive charging system 105.

In one example, the removable back cover 201 contains a set of electrical contacts 404 that are configured to electrically couple the inductive pickup coil 123 and the antenna 117 to corresponding electrical contacts 405 on the case base 203 when the removable back cover 201 is attached to the case base 203. The coupling of the inductive pickup coil 123 takes place through the power conversion circuitry 125, thus resulting in the generated alternating current being converted into a direct current in the removable back cover 201.

In one example, the case containing the wireless mobile communication device 101 has a substantially flat, rear planar surface so as to rest stably on a surface, such as a surface of a wireless inductive charger. The inductive pickup coil 123 is attached to the removable back cover at a location that maximizes the inductive coupling between the inductive pickup coil 123 and the wireless inductive charging base when the wireless mobile communication device 101 is placed on the wireless inductive charger. The example in FIG. 3A illustrates the inductive coil in the approximate center of the removable back cover.

In the example of FIG. 3A, the antenna 117 is sized and positioned with respect to the inductive pickup coil 123 so as to minimize inductive coupling between the two. For example, the antenna 117 is positioned within the central area of the inductive pickup coil 123. As part of this configuration, the antenna 117 and the inductive pickup coil 123 is substantially concentric, as also illustrated in FIG. 3A.

Any means may be employed to attach the inductive pickup coil 123, the antenna 117 and the power conversion circuitry 125 to the removable back cover 400. For example, glue or tape may be used. In other configurations, one or more of these components may be imbedded within the removable back cover 201, such as during its formation.

As illustrated in FIG. 3B, the case base 203 of the case contains the components of the wireless mobile communication device 101A/B that are not contained with the removable back cover 201. The removable back cover 201 and/or the case base 203 contain more or less of the components illustrated in FIGS. 1A and 1B, as well as additional components not illustrated in FIGS. 1A and 1B.

FIGS. 5A and 5B illustrate, respectively, an example of a removable battery 301 and a case base 303 that collectively contain the wireless mobile communication device 101 illustrated in FIGS. 1A and 1B, with components of the inductive charging system 105 within the removable battery 301.

The removable battery 301 functions as the battery 109 illustrated in FIGS. 1A and 1B. In one example, it contains the inductive pickup coil 123, the antenna 117, and the power conversion circuitry 125. It may also contain a set of electrical contacts 304 that are configured to mate with a corresponding set of electrical contacts 307 in the case base 303 when the removable battery 301 is inserted in a battery socket 309 in the case base 303. These electrical contacts couple the inductive pickup coil 123 to the case base 303 through the power conversion circuitry 125, thus resulting in the generated alternating current being converted into a direct current in the removable battery 301.

Correspondingly, the case base 303 contains the remaining components of the wireless mobile communication device 101, namely the wide area communication system 107, its antenna 113, the short range wireless transceiver 103, and the battery charging circuit 109b. As with the different configuration illustrated in FIGS. 3A and 3B, the various components of the wireless mobile communication device 101 may be distributed across the removable battery 301 and the case base 303 differently. The size, shape, location, and depth of the inductive pickup coil 123 and the antenna 117 may be the same as any of the options for these that were set forth above in connection with the discussion of FIG. 3A.

Although not illustrated, a removable back cover may also be provided to seal the back of the case base 303. This removable back cover may or may not have one or more of the components of the wireless mobile communication device 101, in which case such components may not be replicated in the removable battery 301 or the case base 303 due to industrial design considerations. In other configurations in which industrial design may not be problematic, one or more of the components one of in the removable battery 301 or the case base 303 may be replicated in the other of the removable battery 301 or the case base 303 as backups.

In another example (not illustrated), all of the components of the wireless mobile communication device 101 are within the case base. In this configuration, the battery is still be a removable battery, but does not contain any of the components of the wireless mobile communication device 101A/B, except for the battery 109.

Figure 5:
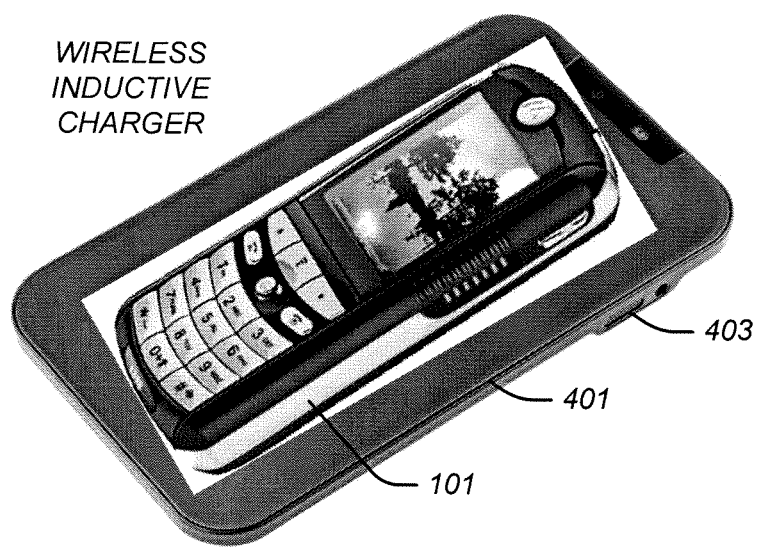
FIG. 5 illustrates an example of the wireless mobile communication device illustrated in FIGS. 1A/B while coupled for inductive charging.

FIG. 5 illustrates an example of the wireless mobile communication device 101A/B illustrated in FIGS. 1A and 1B respectively, being inductively charged by an inductive charging base 401. The wireless inductive charging base 401 is configured to receive a source of energy from a power supply (not shown) through a connector 403. The user is thus able to charge the wireless mobile communication device 101 by placing the wireless mobile communication device 101 on the wireless inductive charging base 401 while the power supply is connected to the connector 403 of the wireless inductive charging base 401.

The components, steps, features, objects, benefits and advantages that have been discussed are merely illustrative. None of them, nor the discussions relating to them, are intended to limit the scope of protection in any way. Although Bluetooth is used in the examples above, ones skilled in the art will readily realize that other communication systems, such as Wi-Fi are supported as well. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

What is claimed is:

1. A wireless mobile communication system comprising:
   a wireless mobile communication device containing a battery and configured to wirelessly communicate with another device via a short range wireless communication link; and
   an inductive charging base configured to inductively charge the battery and to receive data from the wireless mobile communication device via the short range wireless communication link;
   wherein the wireless mobile communication device is configured to:
      determine whether the wireless mobile communication device is connected with the inductive charging base via the short range wireless communication link,
      responsive to determining that the wireless mobile communication device is connected to the inductive charging base via the short range wireless communication link, determine whether the wireless mobile communication device is inductively coupled with the inductive charging base, and
      in response to determining that the wireless mobile communication device is both connected with the inductive charging base via the short range wireless communication link and inductively coupled with the inductive charging base, initiate the inductive charging of the battery and at least one of:
         (1) automatically activate an application stored on the wireless mobile communication device, or
         (2) send data via the short range communication link to the inductive charging base based upon execution of the application.

2. The wireless mobile communication system of claim 1, wherein the inductive charging base is configured to inductively couple and connect with a plurality of wireless mobile communication devices but only to a single communication device at any given moment.

3. The wireless mobile communication system of claim 1, wherein at least one of the inductive charging base and the wireless mobile communication device are configured to stop charging of the battery and sever the short range wireless communication link between the wireless mobile communication device and the inductive charging base if the wireless mobile communication device is separated from the inductive charging base by a greater than effective inductive coupling distance.

4. The wireless mobile communication system of claim 1, wherein the wireless mobile communication device is configured to stop charging of the battery through the inductive charging base if there is no short range wireless communication link between the wireless mobile communication device and the inductive charging base.

5. The wireless mobile communication system of claim 1, wherein
   the wireless mobile communication device is further configured to communicate telephonically via a wide area communication system, and
   if the wireless mobile communication device is placed on the inductive charging base while its wide area communication system is providing telephone communication, the inductive charging base is configured to automatically transmit the telephone communication received from the wireless mobile communication device via the short range wireless communication link through speakers of the inductive charging base.

6. The wireless mobile communication system of claim 5, wherein if the wireless mobile communication device is placed on the inductive charging base while its wide area communication system is not providing telephone communication, the wireless mobile communication device is configured to wirelessly stream audio to the inductive charging base through the short range wireless communication link.

7. The wireless mobile communication system of claim 6, wherein if the wireless mobile communication device is placed on the inductive charging base while its wide area communication system is not providing telephone communication, the inductive charging base is configured to automatically turn the speakers ON, if OFF.

8. The wireless mobile communication system of claim 5, wherein if the wireless mobile communication device is placed on the inductive charging base while its wide area communication system is providing telephone communication, the inductive charging base is configured to automatically turn the speakers ON, if OFF.

9. A wireless mobile communication device, comprising:
   a wide area wireless transceiver for wireless communication for the wireless mobile communication device with a public wide area mobile communication network;
   a short range local wireless transceiver for wireless communication with a short range local wireless transceiver of another device;
   a processor for controlling the transceivers;
   a battery for supplying power to the processor and the transceivers;
   a coil for inductive coupling to an external inductive charging base having a previously identified short range local wireless transceiver;
   a charging circuit coupled to the coil and the battery, configured to charge the battery in response to power received inductively via the coil;
   a memory accessible to the processor;
   application programs stored in the memory for execution by the processor to implement features utilizing the wireless communication via the short range local wireless transceiver; and
   a control program stored in the memory for execution by the processor, wherein execution of the control program by the processor configures the wireless mobile communication device to perform functions, including functions to:
      identify at least one of the application programs as being pre-selected for execution during inductive charging;
      detect pairing of the short range local wireless transceiver of the wireless mobile communication device with the previously identified short range local wireless transceiver of the inductive charging base;
responsive to detecting that the wireless mobile communication device is paired with the inductive charging base, determine whether the wireless mobile communication device is inductively coupled to the inductive charging base by detecting power received from the inductive charging base via the coil; and
after both the pairing and the inductive coupling are detected initiate inductive char in of the batter and (1) automatically activate an identified application program for execution by the processor and (2) initiate transfer of data from the wireless mobile communication device under control of the execution of the automatically activated application program via the short range local wireless transceiver of the wireless mobile communication device to the previously identified short range local wireless transceiver of the inductive charging base.

10. The wireless mobile communication device of claim 9, wherein the short range local wireless transceiver is a Bluetooth transceiver.

11. The wireless mobile communication device of claim 9, wherein the short range local wireless transceiver is a Wi-Fi transceiver.

12. The wireless mobile communication device of claim 9, wherein execution of the control program by the processor further configures the wireless mobile communication device to perform functions to:
determine whether inductive coupling is severed between the wireless mobile communication device and the external inductive charging base; and
disable the identified application program when the severing of inductive coupling is detected.

13. The wireless mobile communication device of claim 12, wherein execution of the control program by the processor further configures the wireless mobile communication device to perform functions to:
determine whether charge is complete; and
disable the inductive charging while allowing the application program to continue, if charge is complete, there is inductive coupling, and there is Bluetooth pairing.

14. The wireless mobile communication device of claim 12, wherein the charging circuit is configured to sever the inductive coupling when the wireless mobile communication device is separated from the external inductive charging base by a greater than effective inductive coupling device.

15. A method of integrating inductive charging and communication of a mobile communication device, the method comprising steps of:
establishing a short range wireless communication link between an inductive charging base and the wireless mobile communication device;
responsive to the establishment of the short range communication link between the inductive charging base and the wireless mobile communication device, detecting if inductive coupling exists between the inductive charging base and the wireless mobile communication device; and
after establishing the short range wireless communication link between the inductive charging base and the wireless mobile communication device and detecting inductive coupling, initiating the inductive charging of the mobile communication device and at least one of (1) activating at least one pre-configured application on the wireless mobile communication device or (2) transferring data from the wireless mobile communication device to the inductive charging base via the short range wireless communication link.

16. The method of claim 15, further comprising:
detecting whether the inductive coupling has been severed; and
in response to detecting that the inductive coupling is severed, de-activating each pre-configured application on the wireless mobile communication device and terminating transfer of data from the wireless mobile communication device to the inductive charging base via the short range wireless communication link.

17. The method of claim 16 further comprising:
determining whether charging of the wireless mobile communication device is complete; and
after determining that the charging is complete, disabling the inductive charging while allowing the application program to continue if inductive coupling exists and the short range wireless communication link remains established.

18. The method of claim 16 wherein the de-activating is performed by the wireless mobile communication device.

19. The method of claim 15, further comprising pre-configuring at least one of a plurality of applications stored on the wireless mobile communication device to be automatically activated during the inductive charging of the wireless mobile communication device.

20. The method of claim 15, further comprising:
receiving, by the charging base, information identifying the mobile communication device prior to the short-range communications link being established;
comparing the received identification information against a list of devices that have had successful connections in the past; and
responsive to the received identification information being in the list, establishing the short range communication link.

* * * * *